United States Patent
Van Woerkom

[19]

[11] Patent Number: 6,135,391
[45] Date of Patent: Oct. 24, 2000

[54] RETENTION SYSTEM FOR A DETACHABLE SPACECRAFT CAPSULE MOUNTED ON A SPACECRAFT

[75] Inventor: Michael Van Woerkom, Lakewood, Colo.

[73] Assignee: Lockheed Martin Corporation, Bethesda, Md.

[21] Appl. No.: 09/286,536

[22] Filed: Apr. 5, 1999

[51] Int. Cl.[7] .................................................. B64G 1/64
[52] U.S. Cl. ...................... 244/158 R; 244/161; 102/377
[58] Field of Search ............................... 244/158 R, 161, 244/162, 159; 102/377, 378

[56] References Cited

U.S. PATENT DOCUMENTS

| | | | |
|---|---|---|---|
| 3,001,739 | 9/1961 | Faget et al. | 244/162 |
| 3,011,604 | 12/1961 | Littleworth et al. | 102/377 |
| 4,219,171 | 8/1980 | Rudmann | 244/161 |
| 4,324,374 | 4/1982 | Wittmann et al. | 244/158 |
| 4,355,775 | 10/1982 | Ganssle | 244/158 |
| 4,359,201 | 11/1982 | Thomson | 244/158 R |
| 4,506,852 | 3/1985 | Adams et al. | 244/158 |
| 4,809,936 | 3/1989 | Whitaker | 244/161 |
| 4,898,348 | 2/1990 | Kahn | 244/161 |
| 5,158,248 | 10/1992 | Mockovciak, Jr. | 244/161 |

*Primary Examiner*—Galen L. Barefoot
*Attorney, Agent, or Firm*—Louis L. Dachs

[57] ABSTRACT

The invention is a system for retaining a detachable capsule to a spacecraft, with the capsule having a heat shield with a peripheral edge. In detail; the system includes a plurality of detachable retention systems with each retention system including a first strut having first and second ends, with the first end rotatably attached to the spacecraft and said second end terminating in a clamp adapted to mate with a portion of the peripheral edge of the heat shield. A spring biases the first strut away from the capsule's heat shield peripheral edge. A second strut is pivotally attached by its first end to the spacecraft and the second end is attached by an explosively actuated fastener assembly mounted on the first strut at a point between the first and second ends thereof.

12 Claims, 5 Drawing Sheets

RETENTION SYSTEM FOR A DETACHABLE SPACECRAFT CAPSULE MOUNTED ON A SPACECRAFT

The US Government has rights in the present invention in accordance with Contract No. NAS 203433 awarded by the National Aeronautics and Space Administration in.

BACKGROUND OF THE INVENTION

1. Field of the Invention

The invention relates to the field of retention systems for space capsules releasable from a spacecraft and, in particular, to a retention system that attaches to the peripheral edge of the capsule's reentry heat shield.

2. Description of Related Art

Releasing a satellite for placement in orbit or the ejecting of a reentry capsule requires reliable releasing mechanisms. Most such systems attach directly to the body of the satellite or capsule. For example U.S. Pat. No. 4,679,752 "Payload Deployment From Shuttle Employing An Ejection Restraint Device" by A Whittmann, et al. and U.S. Pat. No. 4,324,374 "Integrated Spacecraft And Cradle Structure" by A. Whittmann, et al., both disclose securing the satellite to a cradle within a space shuttle payload bay. The satellite is secured by means of ball trunnions held in place by pins, the withdrawing of the pins releasing the satellite from the cradle.

In U.S. Pat. No. 4,359,201 "Payload Deployment From Shuttle With Linear And Angular Velocity" by G. S. Thomson, et al. the satellite is also held in place by a series of ball fittings held in place by retractable pins. In U.S. Pat. No. 4,355,775 "Spacecraft Separation Apparatus" by E. R. Ganssle the satellite is secured in place by a series of hooks on the ends of bell cranks that engage brackets on the satellite. U.S. Pat. No. 4,506,852 "Payload Deployment From Launch Vehicle Using Canted Springs For Imparting Angular And Linear Velocities" by G. J. Adams, et al. the edge of a conical shaped adapter on the satellite mates with a separation ring on a cradle within the launch vehicle and which held together at their mating peripheral edges by means of a segmented clamp. Upon the actuation of explosive bolts, the segments separate and are pulled apart by springs.

All of the above systems are designed to release the satellite with specific linear and angular momentum and are not designed to release space capsules designed to re-enter the atmosphere of the earth or another planet, for that matter. Such capsules have may heat shields that serve as the mounting point, because the center of gravity of the capsule is close or within the heat shield area. In the past, the retention systems relied on explosive bolts that extended through the heat shield or back shell. This degraded the thermal performance of the heat shield or back shell by providing a thermal path through the structure.

Thus, it is a primary object of the invention to provide a system for releasably attaching a capsule to a spacecraft.

It is another primary object of the invention to provide a system for releasably attaching a capsule to a spacecraft that does not require struts or fasteners that penetrate the heat shield of the capsule and which provide a thermal path therethrough.

It is a further object of the invention to provide a system for releasably attaching a capsule to a spacecraft that is simple to install.

It is a still further object of the invention to provide for releasably attaching a capsule to a spacecraft that is highly reliable.

SUMMARY OF THE INVENTION

The invention is a system for retaining a detachable capsule from a spacecraft. The capsule includes a longitudinal axis with a heat shield having a peripheral edge. In detail; the system includes a plurality of detachable retention clamp assemblies equally spaced about the capsule, with each including a first strut having a first end rotatably attached to the spacecraft and a second end terminating in a clamp adapted to mate with a portion of the peripheral edge of the heat shield. A spring biases the first strut away from the capsule's heat shield peripheral edge.

A second strut has a first end pivotally attached to the spacecraft. A fastener assembly detachably engages the second end of the second strut to the first strut at a point between the first and second ends thereof. Preferably, the first end of the first strut is attached to the spacecraft within the peripheral edge of the heat shield of the capsule and the first end of second strut attached to the spacecraft at a point between the centerline of the capsule and the first end of the first strut. Preferably, the fastener assembly is an explosively actuated pin assembly or the like that upon actuation separates the second end of the second strut from the first strut. Thus when assembled, the second end of the first strut engages the peripheral edge of the heat shield and the second strut locks the first strut in this position restraining the capsule to the spacecraft.

To assemble, the first and second strut lengths are adjusted so that the clamp will engage the peripheral edge of the heat shield, when the struts are jointed together. In operation, when the explosively actuated pin assembly is actuated, the second strut disengages from the first strut and the spring forces the clamp at the second end of the first strut out of engagement with the peripheral edge of the capsule. At this point a capsule ejection system mounted on the spacecraft along the centerline of the capsule can be actuated to eject the capsule.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
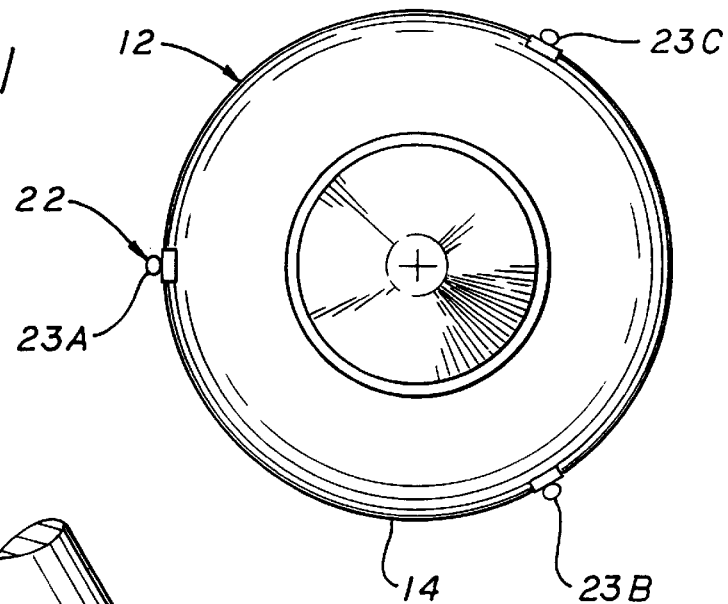
FIG. 1 is a top view of the capsule illustrating the retention system
Figure 2:
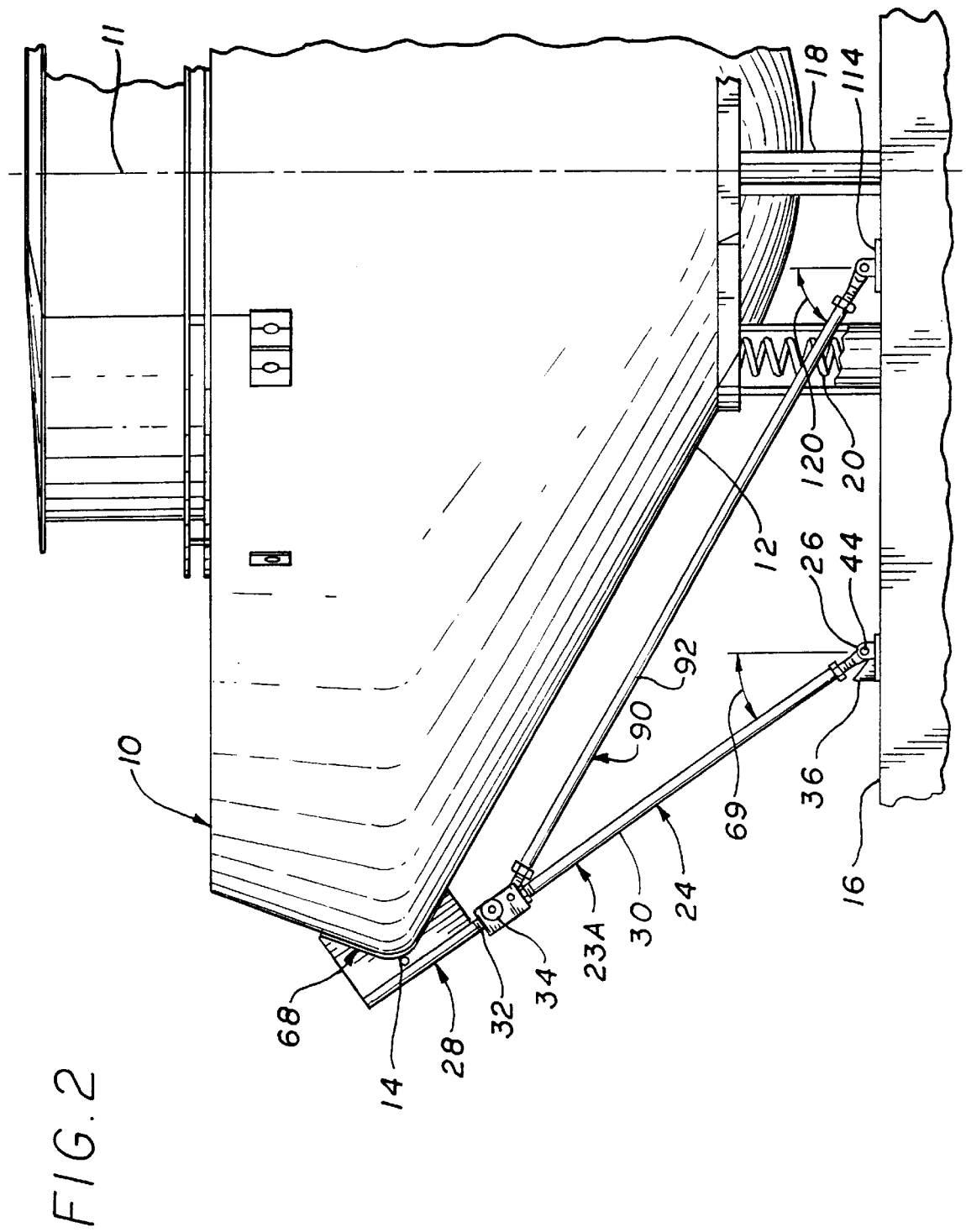
FIG. 2 is a partial side view of the capsule providing a side view of the retention system

Referring to FIGS. 1 and 2, the space capsule, indicated by numeral 10, has a longitudinal axis 11 and includes a heat shield 12 having a peripheral edge portion 14. The capsule 10 is mounted on the spacecraft 16, an in particularly on the capsule ejection system 18. The ejection system 18 may be just a compression spring 20 as illustrated, or an explosively actuated ejector or similar devise (not shown). The retention system, generally indicated by numeral 22, includes a plurality of clamp assemblies 23A, B, C, equally spaced about the capsule 10. While three are shown for purposes of illustration, there could be as few as two or more than three.

Figure 3:
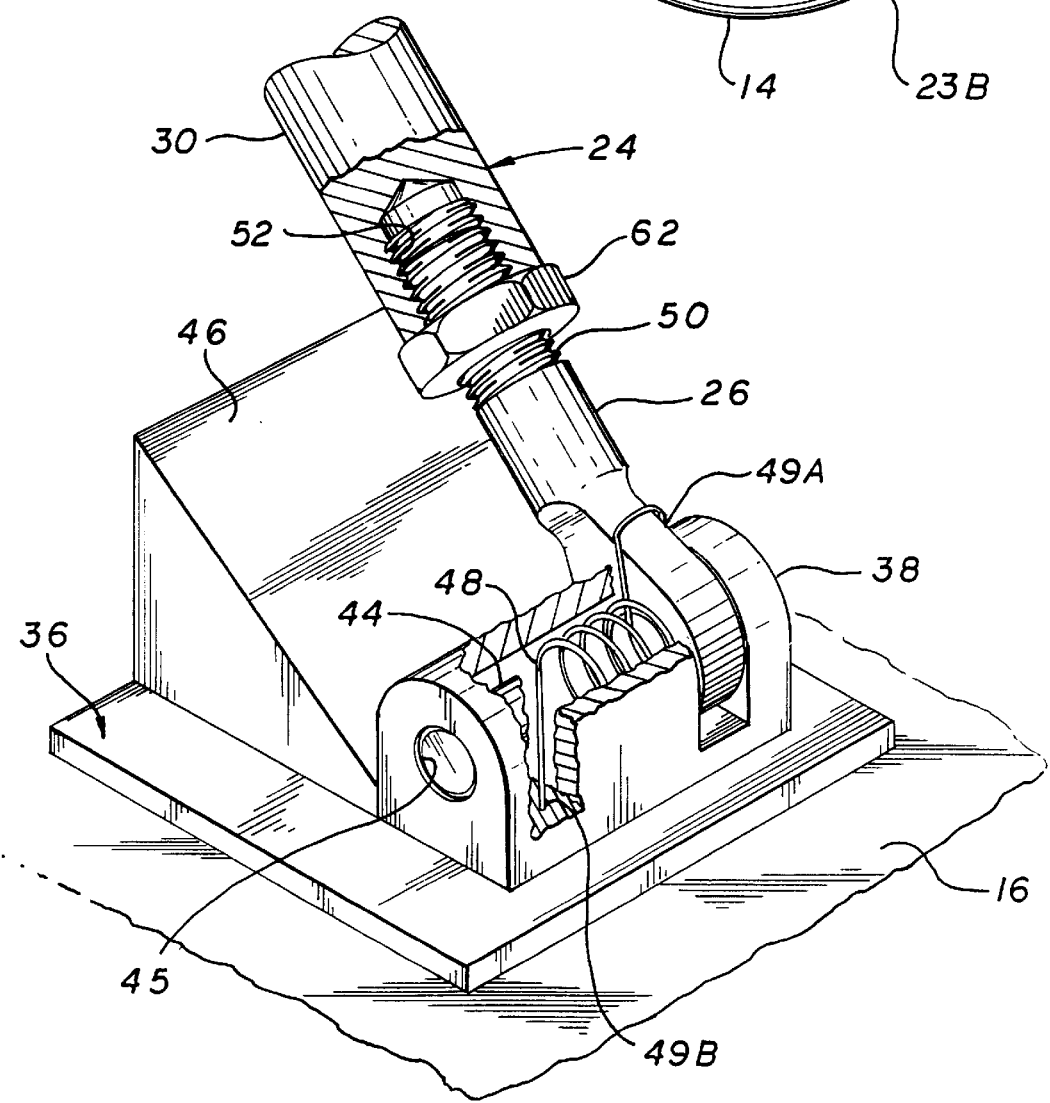
FIG. 3 is an enlarged partial perspective view of the retention system shown in FIG. 2 illustrating the spring biasing of the first strut away from the heat shield of the capsule.
Figure 4:
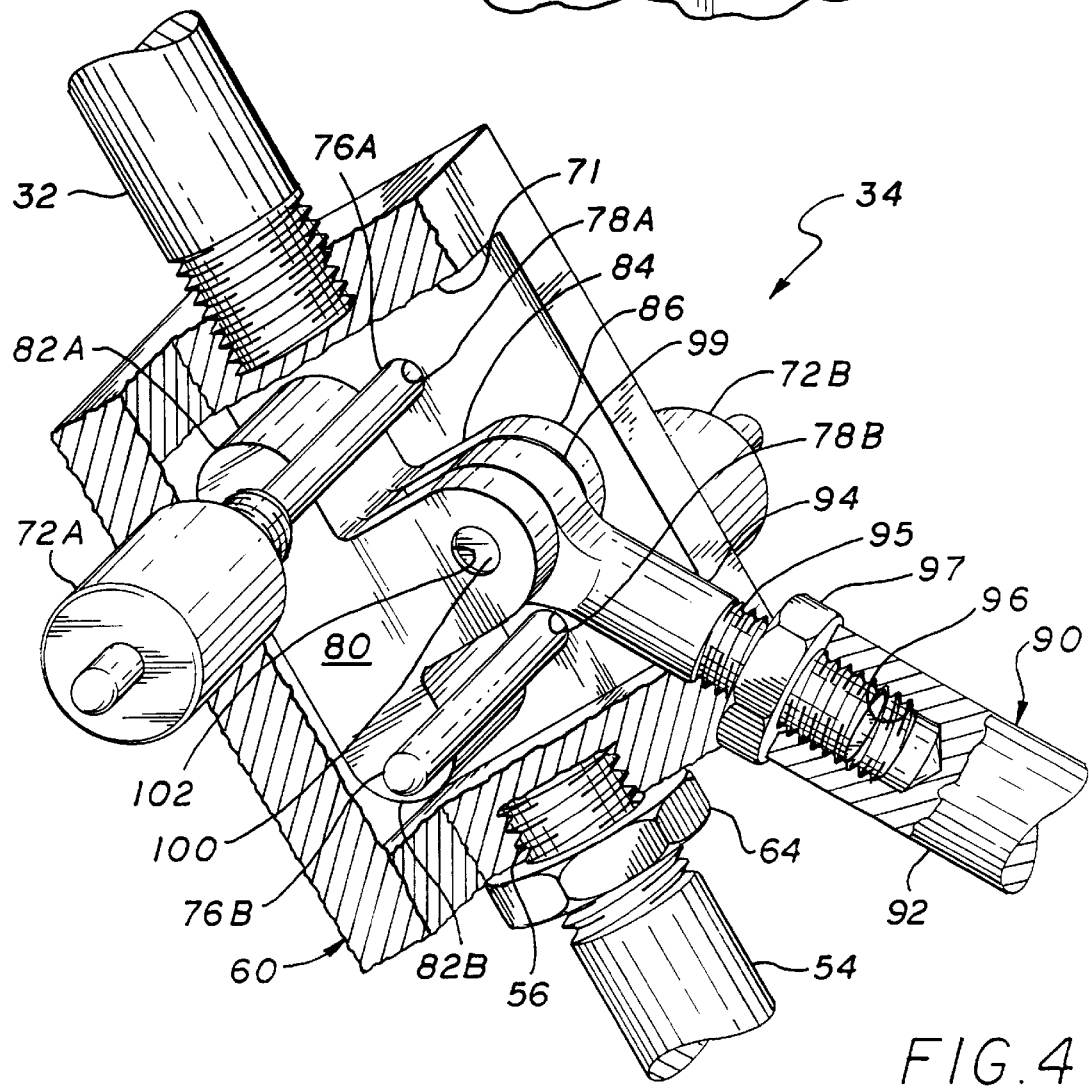
FIG. 4 is an enlarged partial perspective view of the retention system shown in FIG. 2 illustrating the explosively actuated locking pin assembly used to separate the second strut from the first strut.
Figure 5:
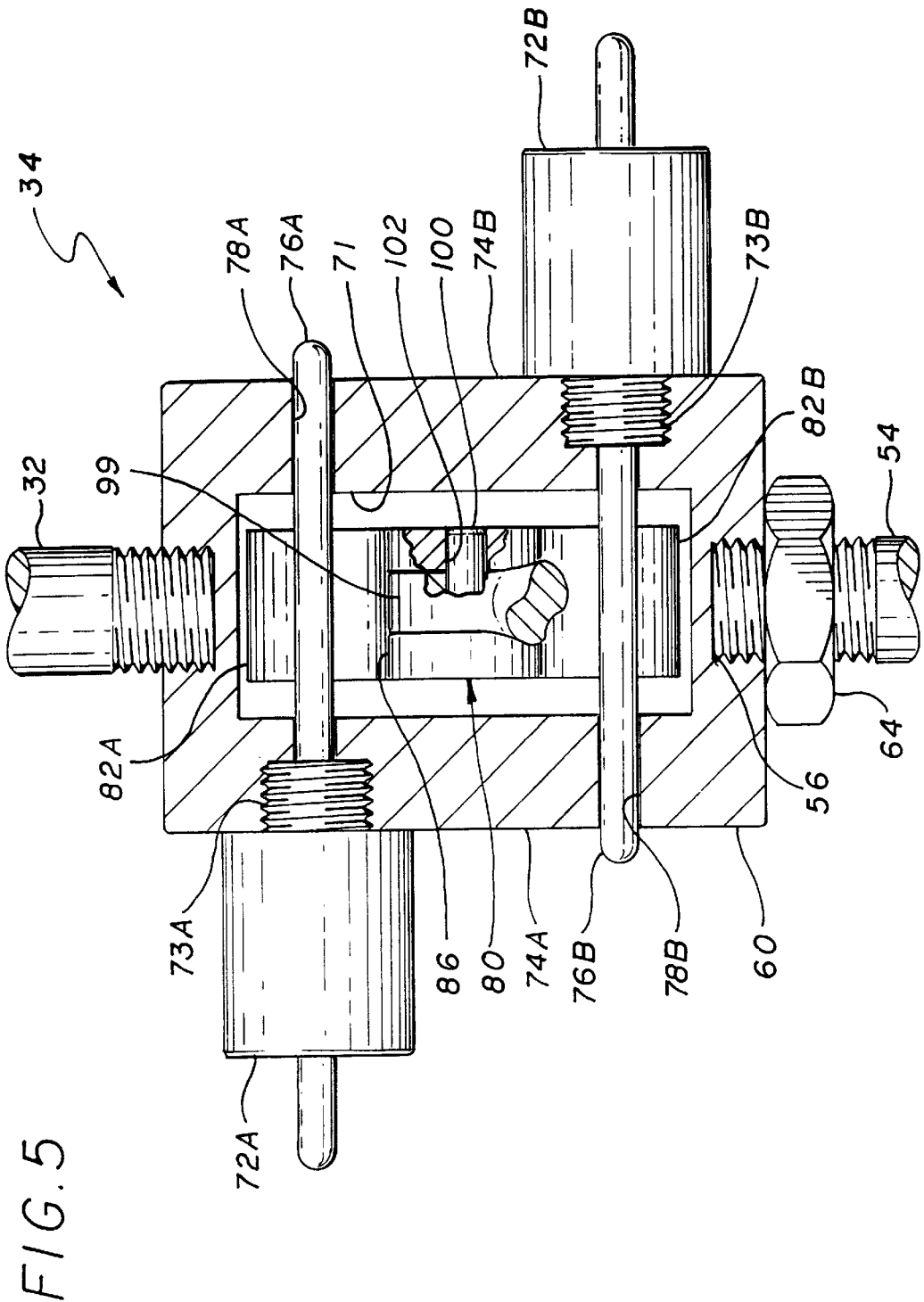
FIG. 5 is a front view of FIG. 4

Still referring to FIGS. 1–3 and additionally to FIGS. 4 and 5, each clamp assembly 23 include a first strut 24 having end fittings 26 and 28 connected by shafts 30 and 32 to an explosively actuated pin assembly 34. In detail, the end fitting 26 is pivotally attached to a fitting 36 mounted to the spacecraft 16. The fitting 36 includes a clevis 38 to which the end fitting 26 is rotatably joined by means of a pin 44 extending through a hole 45 in both the clevis and end fitting 26. The fitting 36 also incorporates a ramp surface 46 that prevents unlimited rotation of the strut 24. Additionally, the fitting 36 includes a coiled spring 48 connected at one end 49A to the end fitting 26, wound around the pin 44 and connected at its opposite end 49B to the fitting 36 and thus biasing the strut 24 toward the ramp surface 46. The end fitting 26 further includes a threaded shaft 50 that engages a threaded hole 52 in the shaft 30. The opposite end 54 of the shaft 30 threadably engages a hole 56 in housing 60 of the pin assembly 34. Thus rotation of the shaft 30 controls the over all length of the strut 24. Jam nuts 62 and 64 are used to lock the shaft 30 in place after adjustment. The end fitting 28 terminates in a jaw 68 shaped to grasp the peripheral edge portion 14 of the heat shield 12. The second end fitting 28, shaft 32 and housing 60 are rigidly connected together, since adjustment of the length of the strut 24 is accomplished by rotation of shaft 30. Note that the first strut 24 when in place is at an acute angle, indicated by numeral 69, to the longitudinal axis 11 of the capsule 10.

The housing 60 of the pin assembly 34 includes a slot 71 with two explosively actuated pin assemblies 72A and 72B threadably engage holes 73A and 73B, mounted to the sides 74A and 74B, respectively, thereof. The pin assemblies 72AB have retractable pins 76A and 76B extending through holes 78A and 78B (and the slot 71) in the housing 60. Mounted with in the slot 71 is a T shaped fitting 80 having arm portions 82A and 82B and a leg portion 84 terminating in a clevis 86. The pins 76AB lock the arm portions 82AB within the slot 71. Upon actuation of the pin assemblies 72AB, the pins 76AB are withdrawn freeing the fitting 80. Note that even if only one pin assembly actuates, the fitting 80 will still release, thus providing redundancy.

Figure 6:
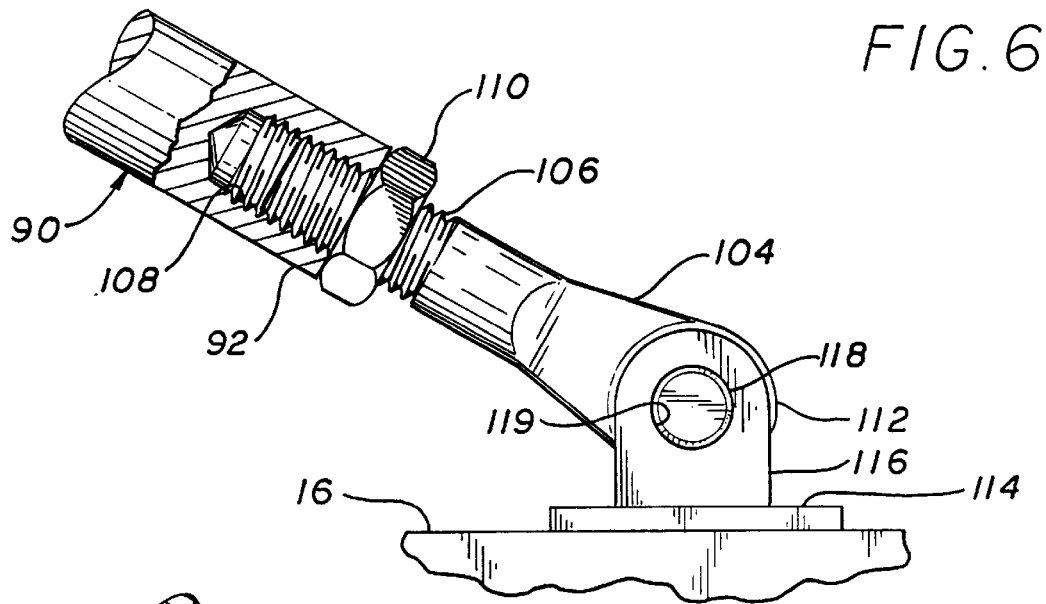
FIG. 6 is an enlarged partial view of FIG. 2 illustrating the attachment of the second strut to the spacecraft.

Still referring to FIGS. 2–5 and additionally to FIG. 6, a second strut 90 includes a central portion 92. The strut 90 includes an end fitting 94 having a threaded shaft 95 in engagement with a threaded hole 96 in the central portion 92 and is held in place by a jam nut 97. The opposite end of the end fitting 94 terminates in a lug 99 in engagement with the clevis 86 of the T shaped fitting 80 within the slot 71 of the housing 60 by means of a pin 100 extending through a hole 102 in both the clevis and lug. The opposite end of the strut 90 includes an end fitting 104 having a treaded end 106 that is in engagement with a threaded hole 108 in the end of the central portion 92. A jam nut 110 locks the end fitting 104 in place. The end fitting 104 also includes a lug 112. Thus the overall length of the strut 90 can be adjusted by backing off the jam nuts 64 and 114 and rotating the central portion 92 of the strut and, thereafter re-tightening the jam nuts. A fitting 114 is mounted to the spacecraft 16 and includes a clevis 116 that is in engagement with the lug 112 by means of a pin 118 mounted in a hole 119 extending through both the lug and clevis. Thus the strut 90 is rotatable about the fitting 114. Note that the strut 90 attaches to the spacecraft 16 at a point nearer the longitudinal axis 11 of the capsule 10 and extends at an acute angle, indicated by numeral 120.

Figure 7:
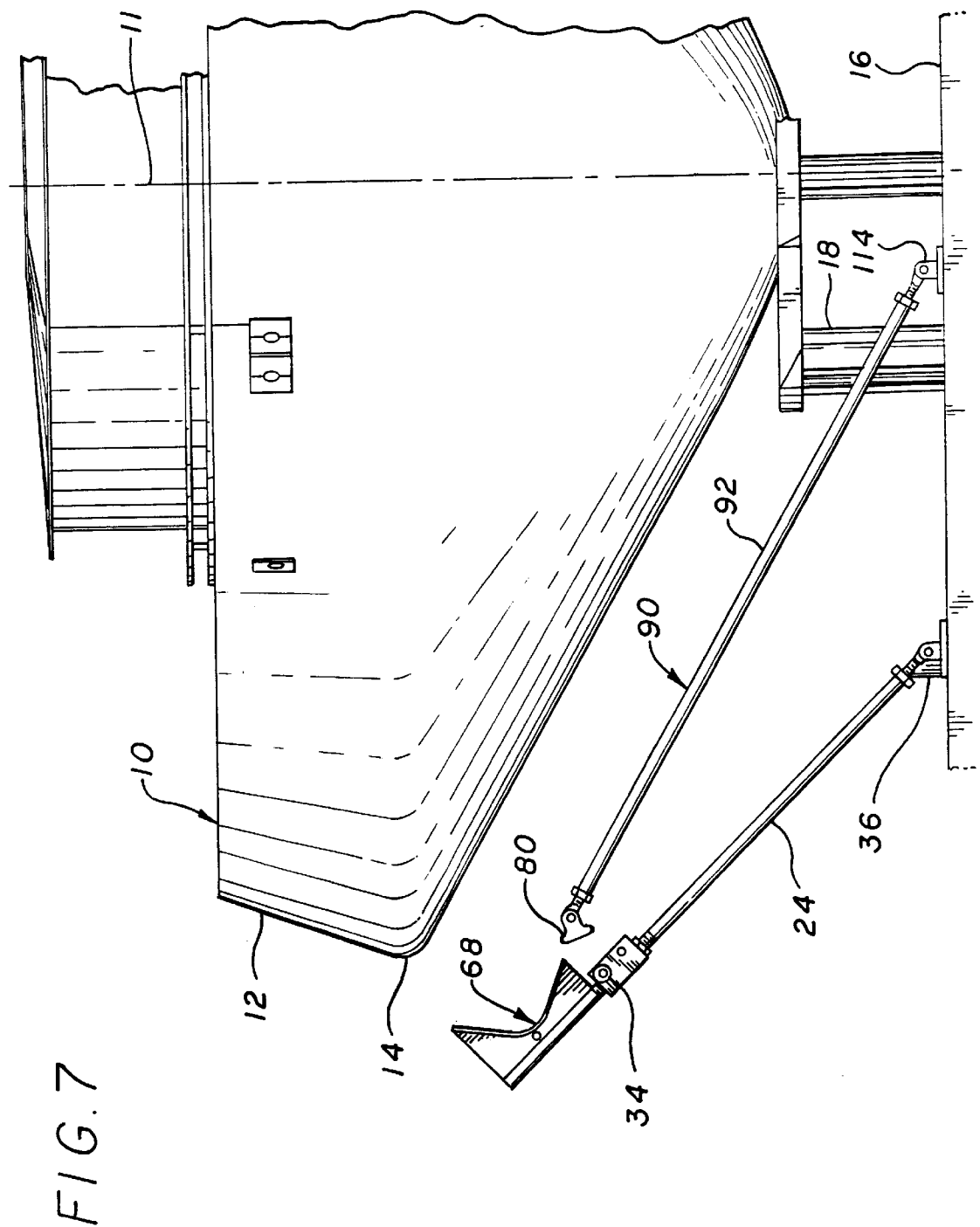
FIG. 7 is a view similar to FIG. 2 illustrating the retention system in the released condition.

Still referring to FIGS. 1–6 and additionally to FIG. 7, after the capsule 10 is mounted, the lengths of the first and second shafts 24 and 90 are adjusted such that when the jaw 68 of clamp assemblies 23ABC, when assembled, engages the peripheral edge 14 of the heat shield 12. The second struts 90 secure the first struts 24 in position such that the jaw 68 locks the capsule in place. Upon actuation of the explosively actuated pin assemblies 34, the first strut 24 are released by the second struts 90, and are free to rotate and do so by urging of the springs 48, separating the jaws 68 from the heat shield 12.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the spacecraft manufacturing industry.

What is claimed is:

1. A system for retaining a detachable capsule to a spacecraft, the capsule having a heat shield with a peripheral edge; the system comprising plurality of detachable clamp assemblies each comprising:

a first strut having first and second ends, said first end rotatably attached to said spacecraft and said second end terminating in a clamp adapted to mate with a portion of the peripheral edge of the heat shield;

a second strut having first and second ends, said first end pivotally attached to the spacecraft; and fastener means detachably engaging said second end of said second strut with said first strut at a point between said first and second ends thereof.

2. The system as set forth in claim 1 wherein said attachment fittings are equally space about the peripheral edge of the heat shield of the capsule.

3. The system as set forth in claim 2 wherein the capsule has a longitudinal axis along the centerline thereof, said first end of said first strut attached to the spacecraft within the peripheral edge of the heat shield of the capsule; and said first end of second strut attached to the spacecraft at a point between the centerline of the capsule and the first end of the first strut.

4. The system as set forth in claim 3 wherein the first and second struts incorporate means to adjust the length thereof.

5. The system as set forth in claim 1, or 2, or 3, or 4, comprising biasing means biasing said first strut away from the capsule's heat shield peripheral edge.

6. The system as set forth in claim 5 wherein said fastener means is an explosively actuated pin assembly.

7. A system for retaining a detachable capsule to a spacecraft, the capsule having a heat shield with a peripheral edge; the system comprising plurality of detachable clamp assemblies each comprising:

a first strut having first and second ends, said first end rotatably attached to said spacecraft and said second end terminating in a clamp adapted to mate with a portion of the peripheral edge of the heat shield;

a second strut having first and second ends, said first end of said second strut pivotally attached to the spacecraft and said second end attached to said first strut between said first and second ends thereof; and fastener means for detachably engaging said second end of said second strut from said first strut.

8. The system as set forth in claim 7 wherein said attachment fittings are equally space about the peripheral edge of the heat shield of the capsule.

9. The system as set forth in claim 8 wherein the capsule has a longitudinal axis along the centerline thereof, said first end of said first strut attached to the spacecraft within the peripheral edge of the heat shield of the capsule; and said first end of second strut attached to the spacecraft at a point between the centerline of the capsule and the first end of the first strut.

10. The system as set forth in claim 9 wherein the first and second struts incorporate means to adjust the length thereof.

11. The system as set forth in claim 7, 8, or 9, or 10, comprising biasing means biasing said first strut away from the capsule's heat shield peripheral edge.

12. The system as set forth in claim 11 wherein said fastener means is an explosively actuated pin assembly.

* * * * *